United States Patent
Sakai et al.

(10) Patent No.: US 8,390,771 B2
(45) Date of Patent: Mar. 5, 2013

(54) LIQUID CRYSTAL DISPLAY DEVICE

(75) Inventors: Takehiko Sakai, Osaka (JP); Dai Chiba, Osaka (JP); Yoshiharu Kataoka, Osaka (JP); Takuya Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

(21) Appl. No.: 13/055,478

(22) PCT Filed: Jun. 22, 2009

(86) PCT No.: PCT/JP2009/002835
§ 371 (c)(1),
(2), (4) Date: Jan. 24, 2011

(87) PCT Pub. No.: WO2010/026682
PCT Pub. Date: Mar. 11, 2010

(65) Prior Publication Data
US 2011/0122348 A1    May 26, 2011

(30) Foreign Application Priority Data
Sep. 8, 2008  (JP) .................................. 2008-229721

(51) Int. Cl.
*G02F 1/1333* (2006.01)
*G06F 3/041* (2006.01)
(52) U.S. Cl. ........... 349/110; 349/56; 349/155; 345/173
(58) Field of Classification Search .................... 349/56, 349/58, 110, 111, 155, 156, 157; 345/173, 345/174, 175
See application file for complete search history.

(56) References Cited

U.S. PATENT DOCUMENTS
5,847,690 A * 12/1998 Boie et al. ...................... 345/104
6,501,529 B1  12/2002 Kurihara et al.
(Continued)

FOREIGN PATENT DOCUMENTS
JP     11-271712 A   10/1999
JP   2000-305715 A   11/2000
(Continued)

OTHER PUBLICATIONS
Official Communication issued in International Patent Application No. PCT/JP2009/002835, mailed on Aug. 25, 2009.

*Primary Examiner* — Brian Healy
(74) *Attorney, Agent, or Firm* — Keating & Bennett, LLP

(57) ABSTRACT

A device includes: an active matrix substrate (20a) including a plurality of first display lines (11a) extending parallel to each other and a plurality of second display lines extending parallel to each other in a direction crossing the first display lines (11a); and a counter substrate (30a) including a black matrix (B) provided so as to overlap the first display lines (11a) and the second display lines, wherein the active matrix substrate (20a) includes a plurality of touch panel lines (11b) extending parallel to each other in a direction in which the first display lines (11a) extend, and portions of the black matrix (B) overlapping the second display lines are electrically conductive and are configured so as to come into contact with the touch panel lines (11b) when the surface of the active matrix substrate (20a) or the counter substrate (30a) is pressed.

10 Claims, 8 Drawing Sheets

U.S. PATENT DOCUMENTS

| | | | |
|---|---|---|---|
| 6,587,169 B1 * | 7/2003 | Yamazaki et al. | 349/110 |
| 6,801,293 B1 | 10/2004 | Nishiyama et al. | |
| 7,522,235 B2 * | 4/2009 | Roh | 349/109 |
| 2011/0122348 A1 * | 5/2011 | Sakai et al. | 349/110 |
| 2011/0242444 A1 * | 10/2011 | Song | 349/43 |
| 2012/0092279 A1 * | 4/2012 | Martin | 345/173 |

FOREIGN PATENT DOCUMENTS

| | | |
|---|---|---|
| JP | 2001-075074 A | 3/2001 |
| JP | 2002-006327 A | 1/2002 |
| JP | 2002-287660 A | 10/2002 |

* cited by examiner

LIQUID CRYSTAL DISPLAY DEVICE

TECHNICAL FIELD

The present invention relates to a liquid crystal display device, and more particularly to a liquid crystal display device having a touch panel.

BACKGROUND ART

A touch panel is a device that can be touched (pressed) with a finger, a pen, or the like, to interactively input information to an information processing device such as a computer.

Touch panels are classified, based on their operating principles, into resistive type, capacitive type, infrared type, surface-acoustic-wave (SAW) type, electromagnetic type, etc. Here, resistive touch panels and capacitive touch panels have been often used in recent years because they can be provided in display devices, etc., at low cost.

The resistive touch panel includes, for example, a pair of glass substrates placed opposing each other, a pair of transparent conductive films provided as resistive films on the inner side of the pair of glass substrates, insulative spacers interposed between the pair of glass substrates forming an air layer between the pair of transparent conductive films, and a position detection circuit for detecting the position touched, and is used by being provided on the front surface of the display screen of a liquid crystal display panel, for example.

With a resistive touch panel having such a configuration, when the surface thereof is touched, the pair of transparent conductive films come into contact with each other (are short-circuited with each other), thus producing a current flow between the pair of transparent conductive films, and the position detection circuit detects the position touched based on a change in voltage occurring when the current flows between the pair of transparent conductive films.

For example, Patent Document 1 discloses a liquid crystal display device provided with a resistive touch panel in which a color correction film with a pigment mixed therein for correcting discoloration due to the resistive touch panel is provided on the front surface or the reverse surface of the resistive touch panel. It is stated that this prevents the color displayed on the liquid crystal display device placed under the resistive touch panel from being discolored due to the resistive touch panel, and also corrects, with the resistive touch panel, colors of the liquid crystal display device where white is not reproduced accurately.

CITATION LIST

Patent Document

PATENT DOCUMENT 1: Japanese Published Patent Application No. 2000-305715

SUMMARY OF THE INVENTION

Technical Problem

Now, with a conventional liquid crystal display device having a resistive touch panel, since the touch panel needs to be provided on the front surface of the display screen of the liquid crystal display panel, there are four constituent substrates such as glass substrates lying on one another, thereby increasing the overall thickness of the device and decreasing the optical transmittance.

The present invention has been made in view of the above, and has an object of providing a liquid crystal display device having a resistive touch panel, in which the thickness of the device itself is reduced, and the decrease in optical transmittance is reduced.

Solution to the Problem

In order to achieve the object, in the present invention, an active matrix substrate is provided with a plurality of touch panel lines extending parallel to each other, and portions of a black matrix of a counter substrate are electrically conductive and are configured to come into contact with the touch panel lines when the surface of the active matrix substrate or the counter substrate is pressed.

Specifically, a liquid crystal display device of the present invention includes: an active matrix substrate including a plurality of first display lines provided so as to extend parallel to each other, and a plurality of second display lines provided so as to extend parallel to each other in a direction crossing the first display lines; a counter substrate placed opposing the active matrix substrate and including a black matrix provided so as to overlap the first display lines and the second display lines; and a liquid crystal layer provided between the active matrix substrate and the counter substrate, wherein the active matrix substrate includes a plurality of touch panel lines provided so as to extend parallel to each other in a direction in which the first display lines extend, and portions of the black matrix overlapping the second display lines are electrically conductive and are configured so as to come into contact with the touch panel lines when a surface of the active matrix substrate or the counter substrate is pressed.

With such a configuration, since the active matrix substrate includes a plurality of first display lines provided so as to extend parallel to each other, and a plurality of second display lines provided so as to extend parallel to each other in the direction crossing the first display lines, a plurality of touch panel lines provided on the active matrix substrate so as to extend parallel to each other in the direction in which the first display lines extend and the conductive portions of the black matrix provided on the counter substrate so as to overlap the second display lines cross each other with the liquid crystal layer interposed therebetween. Since the portion of the black matrix that overlaps the second display line is configured so as to come into contact with the touch panel line to establish electrical connection therebetween when the surface of the active matrix substrate or the counter substrate is pressed, a resistive film of a matrix-type (digital-type) resistive touch panel is specifically realized by the portion of the black matrix that overlaps the second display line and the plurality of touch panel lines. Thus, since a resistive touch panel is provided in the liquid crystal display device, one of the substrates of the touch panel serves as the active matrix substrate and the other substrate as the counter substrate. Thus, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Each of the portions of the black matrix overlapping the second display lines may have a raised portion whose surface is formed in a raised shape in an area where the portion crosses the touch panel line.

With such a configuration, since the portion of the black matrix that overlaps the second display line has the raised portion in the area where the portion crosses the touch panel line, the portion of the black matrix that overlaps the second display line and the touch panel line come into contact with each other at the raised portion formed in the black matrix when the surface of the active matrix substrate or the counter substrate is pressed.

Each raised portion of the black matrix may be formed in a hemispherical shape.

With such a configuration, since each raised portion of the black matrix is formed in a hemispherical shape, the portion of the black matrix that overlaps the second display line and the touch panel line come into contact with each other at the spherical surface of the raised portion formed in the black matrix when the surface of the active matrix substrate or the counter substrate is pressed.

Each of the touch panel lines may include a raised portion whose surface is formed in a raised shape in an area where the touch panel line crosses the portion of the black matrix overlapping the second display line.

With such a configuration, since each touch panel line includes the raised portion in the area where the touch panel line crosses the portion of the black matrix that overlaps the second display line, the portion of the black matrix that overlaps the second display line and the touch panel line come into contact with each other at the raised portion formed in the touch panel line when the surface of the active matrix substrate or the counter substrate is pressed.

The raised portion of the touch panel line may be formed in a hemispherical shape.

With such a configuration, since the raised portion of the touch panel line is formed in a hemispherical shape, the portion of the black matrix that overlaps the second display line and the touch panel line come into contact with each other at the spherical surface of the raised portion formed in the touch panel line when the surface of the active matrix substrate or the counter substrate is pressed.

Portions of the black matrix overlapping the first display lines may be made of a resin.

With such a configuration, since the portions of the black matrix that overlap the first display lines are made of a resin and are insulative, the conductive portions of the black matrix that overlap the second display lines are electrically independent of one another and thus serve as interconnects crossing the touch panel lines of the active matrix substrate.

A color filter may be provided in a plurality of openings of the black matrix.

With such a configuration, since the color filter such as a red layer, a green layer and a blue layer, for example, is provided in the openings of the black matrix, the counter substrate serves as a co-called color filter substrate.

The active matrix substrate or the counter substrate may be provided with a photospacer having a columnar shape for defining a thickness of the liquid crystal layer.

With such a configuration, since the photospacer is interposed between the active matrix substrate and the counter substrate, the insulation between the touch panel line of the active matrix substrate and the portion of the black matrix of the counter substrate that overlaps the second display line is maintained by the photospacer when the surface of the active matrix substrate or the counter substrate is not pressed.

The portions of the black matrix overlapping the second display lines may each include a raised portion whose surface is formed in a raised shape in an area where the portion crosses the touch panel line, and a height of each raised portion of the black matrix may be lower than a height of the photospacer.

With such a configuration, since the height of the photospacer interposed between the active matrix substrate and the counter substrate is higher than the height of the raised portion of the black matrix, the insulation between the touch panel line of the active matrix substrate and the raised portion of the black matrix of the counter substrate is specifically maintained by the photospacer when the surface of the active matrix substrate or the counter substrate is not pressed.

Each touch panel line may include a raised portion whose surface is formed in a raised shape in an area where the touch panel line crosses the portion of the black matrix overlapping the second display line, and a height of the raised portion of the touch panel line may be lower than a height of the photospacer.

With such a configuration, since the height of the photospacer interposed between the active matrix substrate and the counter substrate is higher than the height of the raised portion of the touch panel line, the insulation between the raised portion of the touch panel line of the active matrix substrate and the portion of the black matrix of the counter substrate that overlaps the second display line is specifically maintained by the photospacer when the surface of the active matrix substrate or the counter substrate is not pressed.

Advantages of the Invention

According to the present invention, a plurality of touch panel lines are provided on the active matrix substrate extending parallel to each other, and portions of the black matrix of the counter substrate are electrically conductive and are each configured so as to come into contact with the touch panel lines when the surface of the active matrix substrate or the counter substrate is pressed. Therefore, it is possible to realize a liquid crystal display device having a resistive touch panel in which the thickness of the device itself is reduced and the decrease in optical transmittance is reduced.

BRIEF DESCRIPTION OF THE DRAWINGS

FIG. 2 is a cross-sectional view showing a TFT section of an active matrix substrate 20a of the liquid crystal display device 50a.

FIG. 3 is a cross-sectional view showing a display section of the liquid crystal display device 50a.

FIG. 4 is a cross-sectional view showing a touch panel section of the liquid crystal display device 50a.

FIG. 5 is a plan view showing a counter substrate 30a of the liquid crystal display device 50a.

DESCRIPTION OF EMBODIMENTS

Embodiments of the present invention will now be described in detail with reference to the drawings. Note that the present invention is not limited to the following embodiments.

Embodiment 1

Figure 1:
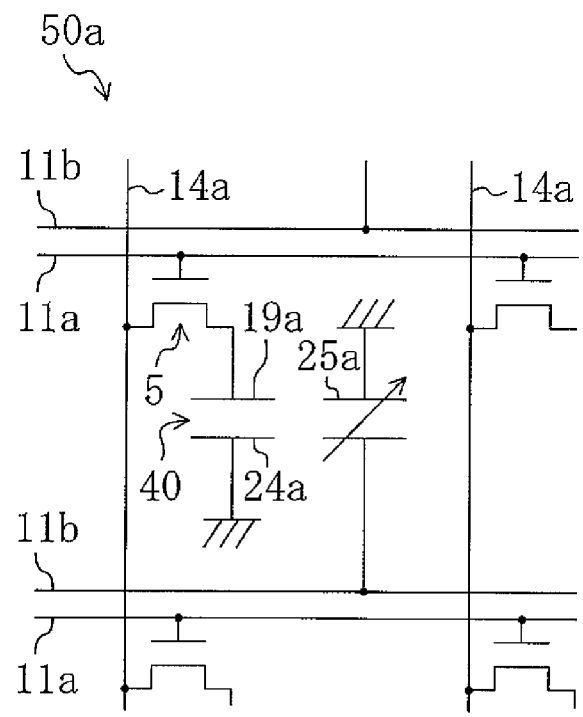
FIG. 1 is an equivalent circuit diagram showing a liquid crystal display device 50a according to Embodiment 1.
Figure 2:
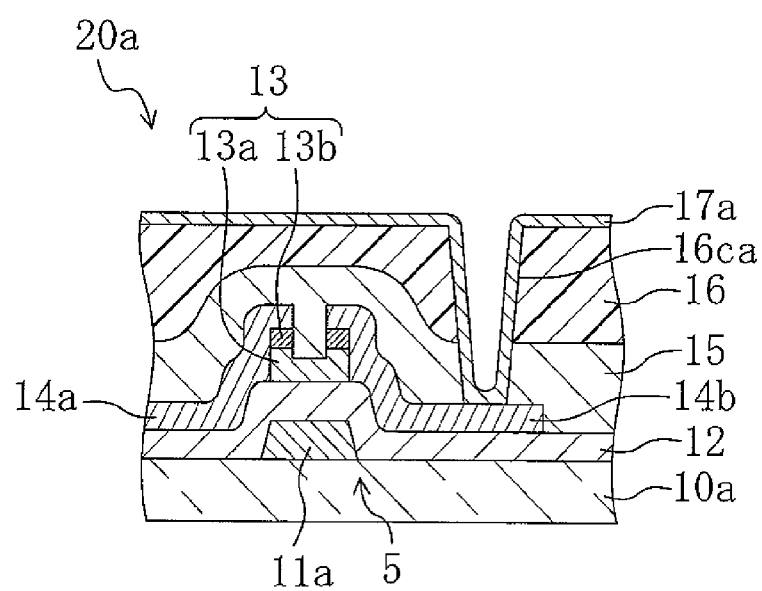
Figure 3:
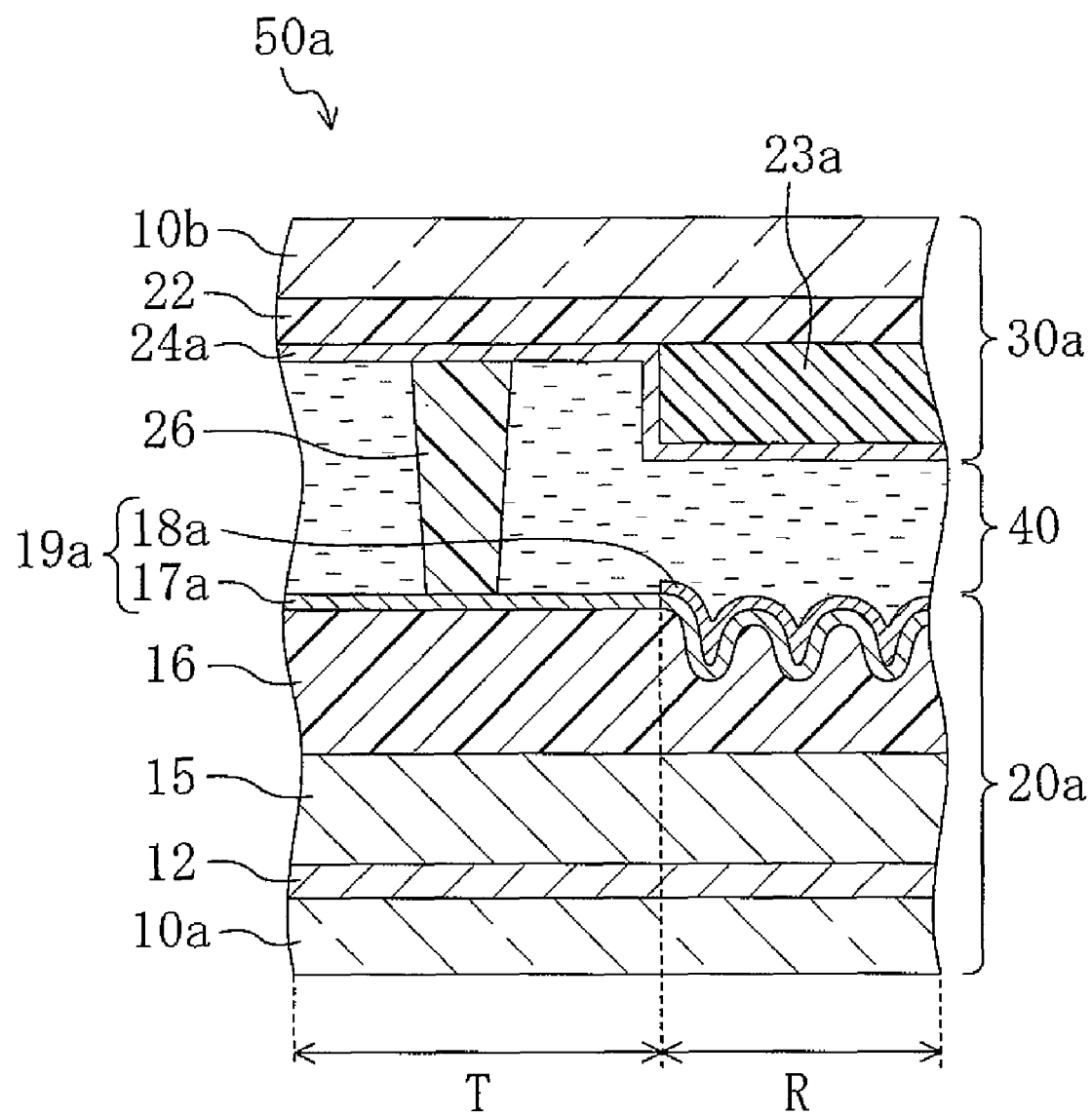
Figure 4:
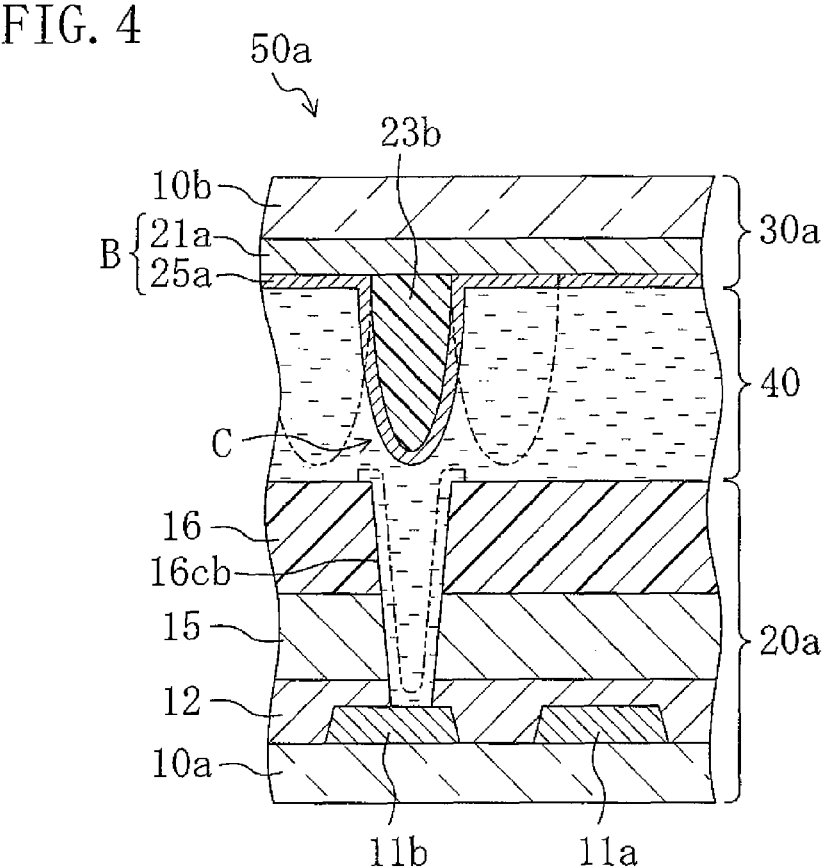
Figure 5:
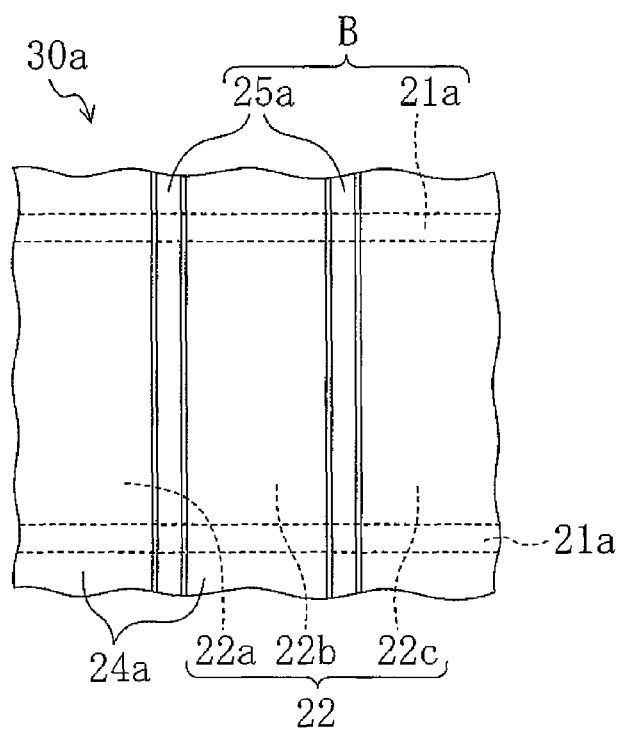

FIGS. 1-5 show Embodiment 1 of a liquid crystal display device of the present invention. Specifically, FIG. 1 is an equivalent circuit diagram showing a liquid crystal display device 50a of the present embodiment. FIG. 2 is a cross-sectional view showing a TFT section of an active matrix substrate 20a of the liquid crystal display device 50a, FIG. 3 is a cross-sectional view showing a display section of the liquid crystal display device 50a, and FIG. 4 is a cross-sectional view showing a touch panel section of the liquid crystal display device 50a. Moreover, FIG. 5 is a plan view showing a counter substrate 30a of the liquid crystal display device 50a.

As shown in FIG. 3, the liquid crystal display device 50a includes: the active matrix substrate 20a and the counter substrate 30a placed so as to oppose each other; a liquid crystal layer 40 provided between the active matrix substrate 20a and the counter substrate 30a; and a sealant (not shown) provided in a frame pattern for bonding the active matrix substrate 20a and the counter substrate 30a to each other and sealing a liquid crystal layer 40 between the active matrix substrate 20a and the counter substrate 30a.

As shown in FIGS. 1-4, the active matrix substrate 20a includes: a plurality of gate lines 11a provided as first display lines so as to extend parallel to each other on an insulating substrate 10a such as a glass substrate; a plurality of touch panel lines 11b provided so as to extend parallel to each other next to the gate lines 11a; a gate insulating film 12 provided so as to cover the gate lines 11a and the touch panel lines 11b; a plurality of source lines 14a provided as second display lines so as to extend parallel to each other in a direction perpendicular to the gate lines 11a on the gate insulating film 12; a plurality of TFTs 5 provided at the intersections between the gate lines 11a and the source lines 14a; a first interlayer insulating film 15 and a second interlayer insulating film 16 provided in this order so as to cover the source lines 14a and the TFTs 5; and a plurality of pixel electrodes 19a provided in a matrix pattern on the second interlayer insulating film 16 and connected to the TFTs 5. Note that while the present embodiment employs a configuration where the touch panel lines 11b and the gate lines 11a are placed next to each other, the touch panel lines (11b) may be placed so as to overlap, while being insulated from, the gate lines 11a.

In the active matrix substrate 20a, a contact hole 16cb is formed in the layered film of the gate insulating film 12, the first interlayer insulating film 15 and the second interlayer insulating film 16 so that a portion of each touch panel line 11b (a portion that overlaps a raised portion C of a BM upper layer portion 25a to be described later) is exposed, as shown in FIG. 4. A conductive film may be formed on the surface of the contact hole 16cb as indicated by a two-dot-chain line in FIG. 4 for the electrical connection with the touch panel line 11b. Note that while the present embodiment employs an interlayer insulating film formed by two layers of the first interlayer insulating film 15 and the second interlayer insulating film 16, the interlayer insulating film may be formed by a single layer.

As shown in FIGS. 1 and 2, the TFT 5 includes a gate electrode (11a) which is a portion of the gate line 11a protruding sideways, the gate insulating film 12 provided so as to cover the gate electrode (11a), a semiconductor layer 13 provided in an island-like pattern at a position overlapping the gate electrode (11a) on the gate insulating film 12, and a source electrode (14a) and a drain electrode 14b provided so as to oppose each other over the semiconductor layer 13. Here, the source electrode (14a) is a portion of the source line 14a protruding sideways. As shown in FIG. 2, the drain electrode 14b is connected to a transparent electrode 17a which forms the pixel electrode 19a via a contact hole 16ca formed in the layered film of the first interlayer insulating film 15 and the second interlayer insulating film 16. Moreover, as shown in FIG. 2, the semiconductor layer 13 includes a lower intrinsic amorphous silicon layer 13a and an upper phosphorus-doped $n^+$ amorphous silicon layer 13b, and a portion of the intrinsic amorphous silicon layer 13a exposed between the source electrode (14a) and the drain electrode 14b forms the channel region.

As shown in FIG. 3, the pixel electrode 19a is formed by the transparent electrode 17a provided on the second interlayer insulating film 16, and a reflective electrode 18a layered on the transparent electrode 17a. Here, since the surface of the second interlayer insulating film 16 under the pixel electrode 19a is formed in a raised/recessed shape, as shown in FIG. 3, the surface of the reflective electrode 18a provided on the surface of the second interlayer insulating film 16 via the transparent electrode 17a is also formed in a raised/recessed shape.

In the active matrix substrate 20a and in the display section of the liquid crystal display device 50a having the same, a reflective region R is defined by the reflective electrode 18a and a transmissive region T is defined by the transparent electrode 17a exposed through the reflective electrode 18a, as shown in FIG. 3.

As shown in FIGS. 1 and 3-5, the counter substrate 30a for example includes: a black matrix B provided in a frame pattern including a lattice pattern inside the frame on an insulating substrate 10b such as a glass substrate so that the black matrix B overlaps the gate lines 11a, the touch panel lines 11b and the source lines 14a on the active matrix substrate 20a; a color filter 22 including red layers 22a, green layers 22b and blue layers 22c provided in openings of the black matrix B; a transparent layer 23a provided in the reflective region R of the color filter 22 so as to compensate for the optical path difference between the reflective region R and the transmissive region T; a common electrode 24a provided so as to cover a BM lower layer portion 21a of the black matrix B to be described later, the transmissive region T of the color filter 22 and the transparent layer 23a (the reflective region R); and a photospacer 26 provided in a columnar shape on the common electrode 24a.

As shown in FIGS. 4 and 5, the black matrix B includes the BM lower layer portion 21a provided so as to overlap the gate lines 11a and the touch panel lines 11b on the active matrix substrate 20a, and the BM upper layer portion 25a provided so as to overlap the source lines 14a on the active matrix substrate 20a.

The BM lower layer portion 21a is made of a resin, and is formed by an organic insulative film with black pigment dispersed therein, for example.

For example, the BM upper layer portion 25a is formed by a light-blocking metal film such as a chromium film, and is electrically conductive. Since the BM upper layer portion 25a has a raised resin layer 23b thereunder in a region where it crosses the touch panel line 11b as shown in FIG. 4, it has the raised portion C whose surface is formed in a raised shape. Note that a plurality of raised portions C may be formed to thereby form a raised/recessed portion as indicated by a two-dot-chain line in FIG. 4.

As shown in FIG. 5, the common electrodes 24a are provided in a stripe pattern so as to extend parallel to each other between the BM upper layer portions 25a.

The liquid crystal layer 40 is formed by a nematic liquid crystal material, or the like, having an electrooptical property.

In the semi-transmissive liquid crystal display device 50a having such a configuration, light coming from the side of the counter substrate 30a is reflected by the reflective electrode 18a in the reflective region R, whereas light from the backlight coming from the side of the active matrix substrate 20a is transmitted in the transmissive region T.

When displaying an image on the liquid crystal display device 50a, for each pixel, a gate signal is sent from the gate line 11a to the gate electrode (11a) to thereby turn ON the TFT 5, and then a source signal is sent from the source line 14a to the source electrode (14a), thus writing a predetermined charge to the pixel electrode 19a, which is formed by the transparent electrode 17a and the reflective electrode 18a, via the semiconductor layer 13 and the drain electrode 14b. In this process, a potential difference occurs between each pixel electrode 19a of the active matrix substrate 20a and the common electrode 24a of the counter substrate 30a in the liquid crystal display device 50a, thus applying a predetermined voltage to the liquid crystal layer 40. In the liquid crystal display device 50a, the orientation of the liquid crystal layer 40 is changed according to the level of the voltage applied to the liquid crystal layer 40, thereby adjusting the optical transmittance of the liquid crystal layer 40 and thus displaying an image.

In the liquid crystal display device 50a, when the surface of the active matrix substrate 20a or the counter substrate 30a is pressed, the raised portion C of the BM upper layer portion 25a comes into contact with the touch panel line 11b to establish electrical connection therebetween, thereby detecting the pressed touch position.

Next, a method for manufacturing the liquid crystal display device 50a of the present embodiment will be described by way of an example. Note that the manufacturing method of the present embodiment includes an active matrix substrate production step, a counter substrate production step, and a substrate bond step.

<Active Matrix Substrate Production Step>

First, a titanium film, an aluminum film and a titanium film, etc., for example, are deposited in this order by a sputtering method across the entire substrate of the insulating substrate 10a such as a glass substrate, and are then patterned by photolithography, thereby forming the gate line 11a, the gate electrode (11a) and the touch panel line 11b to a thickness of about 4000 Å.

Then, a silicon nitride film, or the like, for example, is deposited by a plasma CVD (Chemical Vapor Deposition) method across the entire substrate with the gate line 11a, etc., formed thereon, and the gate insulating film 12 is formed to a thickness of about 4000 Å.

Moreover, an intrinsic amorphous silicon film (thickness: about 2000 Å) and a phosphorus-doped $n^+$ amorphous silicon film (thickness: about 500 Å), for example, are deposited successively by a plasma CVD method across the entire substrate with the gate insulating film 12 formed thereon, and are then patterned to form an island-like pattern on the gate electrode (11a) by photolithography, thus forming a semiconductor formation layer in which an intrinsic amorphous silicon layer and an $n^+$ amorphous silicon layer are layered together.

An aluminum film and a titanium film, etc., for example, are deposited in this order by a sputtering method across the entire substrate with the semiconductor formation layer formed thereon, and are then patterned by photolithography to form the source line 14a, the source electrode (14a) and the drain electrode 14b to a thickness of about 2000 Å.

Then, the $n^+$ amorphous silicon layer of the semiconductor formation layer is etched by using the source electrode (14a) and the drain electrode 14b as a mask, thereby patterning the channel region, and thus forming the semiconductor layer 13 and the TFT 5 having the same.

Moreover, a silicon nitride film, or the like, for example, is deposited by a plasma CVD method across the entire substrate with the TFT 5 formed thereon, thereby forming the first interlayer insulating film 15 to a thickness of about 4000 Å.

Then, a positive-type photosensitive resin, for example, is applied to a thickness of about 3 nm by a spin coat method across the entire substrate with the first interlayer insulating film 15 formed thereon. The applied photosensitive resin is exposed uniformly with relatively low luminous intensity via a first photomask including a plurality of circular light-blocking portions spaced apart from one another in a random pattern, and is then exposed uniformly with relatively high luminous intensity via a second photomask including openings formed at positions corresponding to the contact holes 16ca over the drain electrodes 14b and the contact holes 16cb over the touch panel lines 11b, after which it is developed. Thus, portions of the photosensitive resin that have been exposed with high luminous intensity as described above are completely removed, about 40% of the thickness remains of those that have been exposed with low luminous intensity, and about 80% of the thickness remains of those that have not been exposed. Moreover, the substrate on which the photosensitive resin has been developed is heated to about 200° C. so as to thermally deform the photosensitive resin, thereby forming the second interlayer insulating film 16 in which the surface of the reflective region R is in a smooth raised/recessed shape. Then, the first interlayer insulating film 15 and the layered film of the gate insulating film 12 and the first interlayer insulating film 15, exposed through the second interlayer insulating film 16, are etched to thereby form the contact holes 16ca and 16cb, respectively.

Then, a transparent conductive film of an ITO (Indium Tin Oxide) film, or the like, is deposited on the second interlayer insulating film 16 across the entire substrate by a sputtering method, and is then patterned by photolithography, thereby forming the transparent electrode 17a to a thickness of about 1000 Å.

Moreover, a molybdenum film (thickness: about 750 Å) and an aluminum film (thickness: about 1000 Å) are deposited in this order by a sputtering method across the entire substrate with the transparent electrode 17a formed thereon, and are then patterned by photolithography to thereby form the reflective electrode 18a, thus providing the pixel electrode 19a including the transparent electrode 17a and the reflective electrode 18a.

Finally, a polyimide resin is applied by a printing method across the entire substrate with the pixel electrode 19a formed thereon, and then a rubbing process is performed, thereby forming an alignment film to a thickness of about 1000 Å.

The active matrix substrate 20a can be produced as described above.

<Counter Substrate Production Step>

First, an acrylic-type photosensitive resin including black pigment such as carbon particles dispersed therein, for example, is applied by a spin coat method across the entire substrate of the insulating substrate 10b such as a glass substrate. The applied photosensitive resin is patterned by being exposed via a photomask and then developed, thereby forming the BM lower layer portion 21a to a thickness of about 2.0 µm.

Then, a positive-type photosensitive resin, for example, is applied by a spin coat method across the entire substrate with the BM lower layer portion 21a formed thereon, and the applied photosensitive resin is exposed via a photomask and then developed and heated in a similar manner to that of the method for forming the second interlayer insulating film 16 described above, thereby forming the resin layer 23b to a thickness of about 2.0 µm.

Moreover, a chromium film, for example, is deposited by a sputtering method across the entire substrate with the resin layer 23b formed thereon, and is then patterned by photolithography, thus forming the BM upper layer portion 25a to a thickness of about 2000 Å.

Then, an acrylic-type photosensitive resin colored in red, green or blue, for example, is applied on the substrate with the BM upper layer portion 25a formed thereon, and the applied photosensitive resin is patterned by being exposed via a photomask and then developed, thereby forming a colored layer of a selected color (e.g., the red layer 22a) to a thickness of about 2.0 µm. Moreover, similar steps are repeated for the other two colors to thereby form the colored layers of the other two colors (e.g., the green layer 22b and the blue layer 22c) to a thickness of about 2.0 µm, thus providing the color filter 22.

Moreover, an acrylic-type photosensitive resin is applied by a spin coat method on the substrate with the color filter 22 formed thereon, and the applied photosensitive resin is exposed via a photomask and then developed, thereby forming the transparent layer 23a to a thickness of about 2 µm.

Then, an ITO film, for example, is deposited by a sputtering method across the entire substrate with the transparent layer 23a formed thereon, and is then patterned by photolithography, thereby forming the common electrode 24a to a thickness of about 1500 Å.

Moreover, an acrylic-type photosensitive resin is applied by a spin coat method across the entire substrate with the common electrode 24a formed thereon, and the applied photosensitive resin is exposed via a photomask and then developed, thereby forming the photospacer 26 to a thickness of about 4 µm.

Finally, a polyimide-type resin is applied by a printing method across the entire substrate with the photospacer 26 formed thereon, and then a rubbing process is performed, thereby forming an alignment film to a thickness of about 1000 Å.

The counter substrate 30a can be produced as described above.

<Bond Step>

First, a frame pattern is drawn with a sealant of a UV-curing-and-thermosetting-type resin, or the like, by using a dispenser, for example, on the counter substrate 30a produced through the counter substrate production step.

Then, a liquid crystal material is dropped onto a region inside the sealant of the counter substrate 30a with the sealant drawing.

Moreover, the counter substrate 30a onto which the liquid crystal material has been dropped and the active matrix substrate 20a produced through the active matrix substrate production step described above are bonded to each other under depressurized atmosphere, and then the bonded assembly is released to atmospheric pressure to thereby pressurize the front surface and the reverse surface of the assembly.

Finally, the sealant sandwiched by the assembly is irradiated with UV light, and then the assembly is heated to thereby cure the sealant.

The liquid crystal display device 50a can be produced as described above.

As described above, with the liquid crystal display device 50a of the present embodiment, since the active matrix substrate 20a includes a plurality of gate lines 11a provided so as to extend parallel to each other, and a plurality of source lines 14a provided so as to extend parallel to each other in a direction perpendicular to the gate lines 11a, a plurality of touch panel lines 11b provided on the active matrix substrate 20a so as to extend parallel to each other in a direction in which the gate lines 11a extend and conductive portions of the black matrix B provided on the counter substrate 30a so as to overlap the source lines 14a, i.e., the BM upper layer portions 25a, cross each other with the liquid crystal layer 40 interposed therebetween. Since the BM upper layer portion 25a is configured so as to come into contact with the touch panel line 11b to establish electrical connection therebetween when the surface of the active matrix substrate 20a or the counter substrate 30a is pressed, a resistive film of a matrix-type (digital-type) resistive touch panel is specifically realized by the BM upper layer portions 25a of the black matrix B and the plurality of touch panel lines 11b. Thus, since a resistive touch panel is provided in the liquid crystal display device 50a, one of the substrates of the touch panel serves as the active matrix substrate 20a and the other substrate as the counter substrate 30a. Thus, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

With the liquid crystal display device 50a of the present embodiment, since the photospacer 26 is sandwiched between the active matrix substrate 20a and the counter substrate 30a, the insulation between the touch panel line 11b on the active matrix substrate 20a and the BM upper layer portion 25a of the black matrix B on the counter substrate 30a can be maintained by the photospacer 26 when the surface of the active matrix substrate 20a or the counter substrate 30a is not pressed.

Embodiment 2

Figure 6:
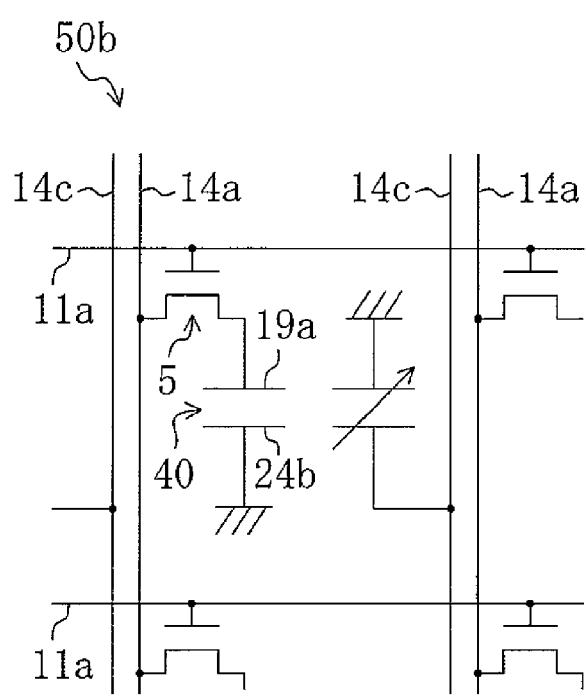
FIG. 6 is an equivalent circuit diagram showing a liquid crystal display device 50b according to Embodiment 2.
Figure 7:
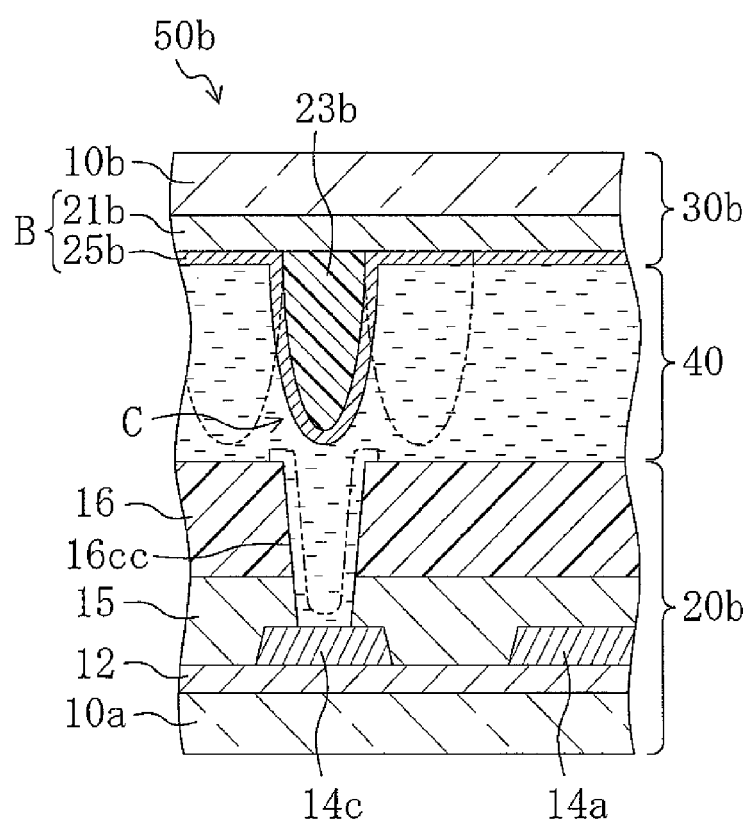
FIG. 7 is a cross-sectional view showing a touch panel section of the liquid crystal display device 50b.
Figure 8:
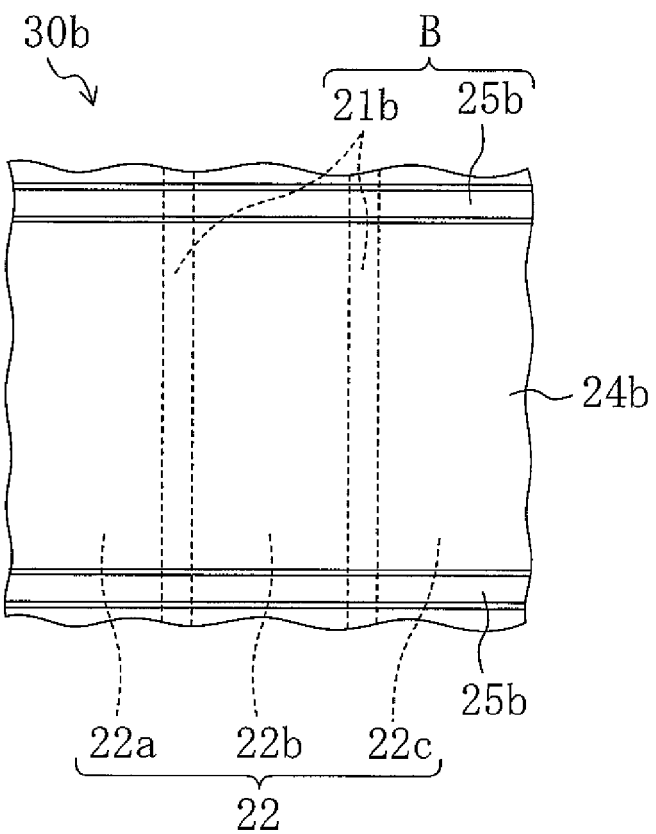
FIG. 8 is a plan view showing a counter substrate 30b of the liquid crystal display device 50b.

FIGS. 6-8 show Embodiment 2 of a liquid crystal display device of the present invention. Specifically, FIG. 6 is an equivalent circuit diagram showing a liquid crystal display device 50b of the present embodiment. FIG. 7 is a cross-sectional view showing a touch panel section of the liquid crystal display device 50b, and FIG. 8 is a plan view showing a counter substrate 30b of the liquid crystal display device 50b. Note that in the following embodiments, like elements to those of FIGS. 1-5 will be denoted by like reference numerals, and will not be described in detail.

While the first display line is the gate line and the second display line is the source line in the liquid crystal display device 50a of Embodiment 1, the first display line is the source line and the second display line is the gate line in the liquid crystal display device 50b of the present embodiment.

As shown in FIG. 7, the liquid crystal display device 50b includes: an active matrix substrate 20b and the counter substrate 30b placed so as to oppose each other; the liquid crystal layer 40 provided between the active matrix substrate 20b and the counter substrate 30b; and a sealant (not shown) provided in a frame pattern for bonding the active matrix substrate 20b and the counter substrate 30b to each other and sealing the liquid crystal layer 40 between the active matrix substrate 20b and the counter substrate 30b.

As shown in FIGS. 6 and 7, the active matrix substrate 20b includes: a plurality of gate lines 11a provided as second display lines so as to extend parallel to each other on the insulating substrate 10a such as a glass substrate; the gate insulating film 12 provided so as to cover the gate lines 11a; a plurality of source lines 14a provided as first display lines so as to extend parallel to each other in a direction perpendicular to the gate lines 11a on the gate insulating film 12; a plurality of touch panel lines 14c provided so as to extend parallel to each other next to the source lines 14a; a plurality of TFTs 5 provided at the intersections between the gate lines 11a and the source lines 14a; the first interlayer insulating film 15 and the second interlayer insulating film 16 provided in this order so as to cover the source lines 14a, the touch panel lines 14c and the TFTs 5; and a plurality of pixel electrodes 19a provided in a matrix pattern on the second interlayer insulating film 16 and connected to the TFTs 5.

In the active matrix substrate 20b, a contact hole 16cc is formed in the layered film of the first interlayer insulating film 15 and the second interlayer insulating film 16 so that a portion of each touch panel line 14c (a portion that overlaps a raised portion C of a BM upper layer portion 25b to be described later) is exposed, as shown in FIG. 7. A conductive film may be formed on the surface of the contact hole 16cc as indicated by a two-dot-chain line in FIG. 7 for the electrical connection with the touch panel line 14c.

As shown in FIGS. 6-8, the counter substrate 30b includes, for example: the black matrix B provided in a frame pattern including a lattice pattern inside the frame on the insulating substrate 10b such as a glass substrate so that the black matrix B overlaps the gate lines 11a, the source lines 14a and the touch panel lines 14c on the active matrix substrate 20b; the color filter 22 including the red layers 22a, the green layers 22b and the blue layers 22c provided in openings of the black matrix B; the transparent layer 23a provided in the reflective region R of the color filter 22 so as to compensate for the optical path difference between the reflective region R and the transmissive region T; a common electrode 24b provided so as to cover a BM lower layer portion 21b of the black matrix B to be described later, the transmissive region T of the color filter 22 and the transparent layer 23a (the reflective region R); and the photospacer 26 provided in a columnar shape on the common electrode 24b.

As shown in FIGS. 7 and 8, the black matrix B includes the BM lower layer portion 21b provided so as to overlap the source lines 14a and the touch panel lines 14b on the active matrix substrate 20b, and the BM upper layer portion 25b provided so as to overlap the gate lines 11a on the active matrix substrate 20b.

The BM lower layer portion 21b is made of a resin, and is formed by an organic insulative film with black pigment dispersed therein, for example.

For example, the BM upper layer portion 25b is formed by a light-blocking metal film such as a chromium film, and is electrically conductive. Since the BM upper layer portion 25b has the raised resin layer 23b thereunder in a region where it crosses the touch panel line 14c as shown in FIG. 7, it has the raised portion C whose surface is formed in a raised shape. Note that a plurality of raised portions C may be formed to thereby form a raised/recessed portion as indicated by a two-dot-chain line in FIG. 7.

As shown in FIG. 8, the common electrodes 24b are provided in a stripe pattern so as to extend parallel to each other between the BM upper layer portions 25b.

In the semi-transmissive liquid crystal display device 50b having such a configuration, light coming from the side of the counter substrate 30b is reflected by the reflective electrode 18a in the reflective region R, whereas light from the backlight coming from the side of the active matrix substrate 20b is transmitted in the transmissive region T.

When displaying an image on the liquid crystal display device 50b, for each pixel, a gate signal is sent from the gate line 11a to the gate electrode (11a) to thereby turn ON the TFT 5, and then a source signal is sent from the source line 14a to the source electrode (14a), thus writing a predetermined charge to the pixel electrode 19a, which is formed by the transparent electrode 17a and the reflective electrode 18a, via the semiconductor layer 13 and the drain electrode 14b. In this process, a potential difference occurs between each pixel electrode 19a of the active matrix substrate 20b and the common electrode 24b of the counter substrate 30b in the liquid crystal display device 50b, thus applying a predetermined voltage to the liquid crystal layer 40. In the liquid crystal display device 50b, the orientation of the liquid crystal layer 40 is changed according to the level of the voltage applied to the liquid crystal layer 40, thereby adjusting the optical transmittance of the liquid crystal layer 40 and thus displaying an image.

In the liquid crystal display device 50b, when the surface of the active matrix substrate 20b or the counter substrate 30b is pressed, the raised portion C of the BM upper layer portion 25b comes into contact with the touch panel line 14c to establish electrical connection therebetween, thereby detecting the pressed touch position.

Note that the liquid crystal display device 50b of the present embodiment can be manufactured by changing the patterns of the constituent films in the active matrix production step and the counter substrate production step described above in Embodiment 1, and therefore detailed description thereof will be omitted.

As described above, with the liquid crystal display device 50b of the present embodiment, since the active matrix substrate 20b includes a plurality of source lines 14a provided so as to extend parallel to each other, and a plurality of gate lines 11a provided so as to extend parallel to each other in a direction perpendicular to the source lines 14a, a plurality of touch panel lines 14c provided on the active matrix substrate 20b so as to extend parallel to each other in a direction in which the source lines 14a extend and conductive portions of the black matrix B provided on the counter substrate 30b so as to overlap the gate lines 11a, i.e., the BM upper layer portions 25b, cross each other with the liquid crystal layer 40 interposed therebetween. Since the BM upper layer portion 25b is configured so as to come into contact with the touch panel line 14c to establish electrical connection therebetween when the surface of the active matrix substrate 20b or the counter substrate 30b is pressed, a resistive film of a matrix-type (digital-type) resistive touch panel is specifically realized by the BM upper layer portions 25b of the black matrix B and the plurality of touch panel lines 14c. Thus, since a resistive touch panel is provided in the liquid crystal display device, one of the substrates of the touch panel serves as the active matrix substrate 20b and the other substrate as the counter substrate 30b. Thus, as in Embodiment 1, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Embodiment 3

Figure 9:
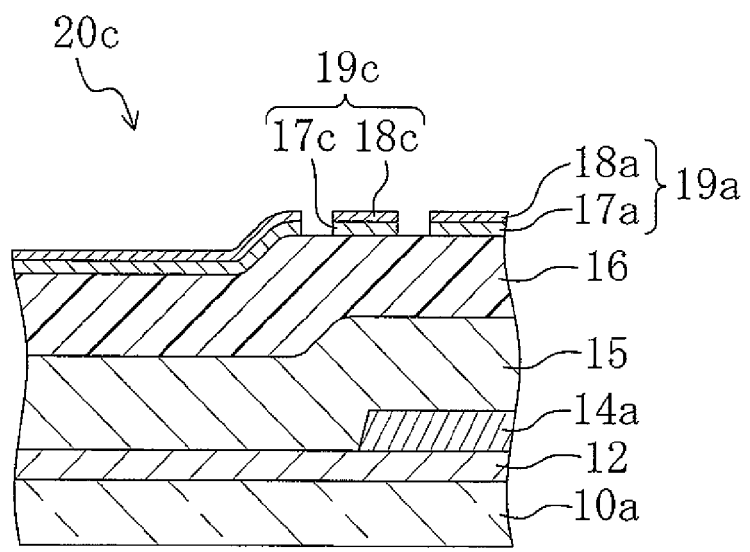
FIG. 9 is a cross-sectional view showing a touch panel section of an active matrix substrate 20c of a liquid crystal display device according to Embodiment 3.

FIG. 9 is a cross-sectional view showing a touch panel section of an active matrix substrate 20c of a liquid crystal display device of the present embodiment.

In the active matrix substrate 20a of Embodiment 1, the touch panel lines 11b are formed simultaneously with the gate lines 11a so as to be parallel to the gate lines 11a, and in the active matrix 20b of Embodiment 2, the touch panel lines 14c are formed simultaneously with the source lines 14a so as to be parallel to the source lines 14a. In the active matrix 20c of the present embodiment, touch panel lines 19c are formed simultaneously with the pixel electrodes 19a so as to be parallel to the source lines 14a.

Specifically, the liquid crystal display device of the present embodiment includes: the active matrix 20c; the counter substrate 30b of Embodiment 2 placed opposing the active matrix 20c; the liquid crystal layer 40 provided between the active matrix substrate 20c and the counter substrate 30b; and a sealant (not shown) provided in a frame pattern for bonding the active matrix substrate 20c and the counter substrate 30b to each other and sealing the liquid crystal layer 40 between the active matrix substrate 20c and the counter substrate 30b.

In the active matrix 20c, the touch panel lines 19c are provided along the direction in which the source lines 14a extend between the plurality of pixel electrodes 19a provided in a matrix pattern on the second interlayer insulating film 16, as shown in FIG. 9. Here, the touch panel line 19c includes a TP lower layer portion 17c formed simultaneously with the transparent electrode 17a, and a TP upper layer portion 18c formed simultaneously with the reflective electrode 18a.

With the liquid crystal display device of the present embodiment, when the surface of the active matrix substrate 20c or the counter substrate 30b is pressed, the raised portion C of the BM upper layer portion 25b on the counter substrate 30b comes into contact with the touch panel line 19c on the active matrix substrate 20c to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25b of the black matrix B on the counter substrate 30b and the touch panel lines 19c on the active matrix 20c, and the resistive touch panel is provided in the liquid crystal display device, one of the substrates of the touch panel serves as the active matrix substrate 20c and the other substrate as the counter substrate 30b. Thus, as in Embodiments 1 and 2, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Embodiment 4

Figure 10:
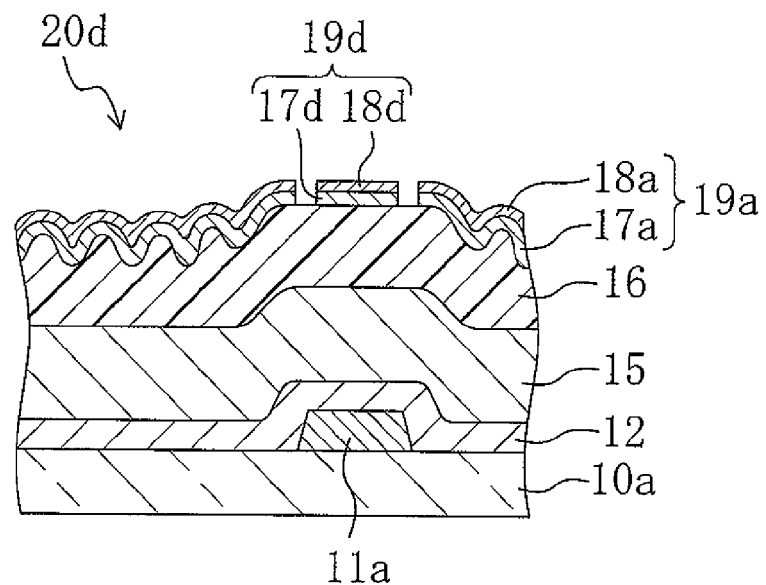
FIG. 10 is a cross-sectional view showing a touch panel section of an active matrix substrate 20d of a liquid crystal display device according to Embodiment 4.

FIG. 10 is a cross-sectional view showing a touch panel section of an active matrix substrate 20d of a liquid crystal display device of the present embodiment.

While the touch panel lines 19c are formed simultaneously with the pixel electrodes 19a so as to be parallel to the source lines 14a in the active matrix 20c of Embodiment 3, touch panel lines 19d are formed simultaneously with the pixel electrodes 19a so as to be parallel to the gate lines 11a in the active matrix 20d of the present embodiment.

Specifically, the liquid crystal display device of the present embodiment includes: the active matrix 20d; the counter substrate 30a of Embodiment 1 placed opposing the active matrix 20d; the liquid crystal layer 40 provided between the active matrix substrate 20d and the counter substrate 30a; and a sealant (not shown) provided in a frame pattern for bonding the active matrix substrate 20d and the counter substrate 30a to each other and sealing the liquid crystal layer 40 between the active matrix substrate 20d and the counter substrate 30a.

In the active matrix 20d, the touch panel lines 19d are provided along the direction in which the gate lines 11a extend between the plurality of pixel electrodes 19a provided in a matrix pattern on the second interlayer insulating film 16, as shown in FIG. 10. Here, the touch panel line 19d includes a TP lower layer portion 17d formed simultaneously with the transparent electrode 17a, and a TP upper layer portion 18d formed simultaneously with the reflective electrode 18a.

With the liquid crystal display device of the present embodiment, when the surface of the active matrix substrate 20d or the counter substrate 30a is pressed, the raised portion C of the BM upper layer portion 25a on the counter substrate 30a comes into contact with the touch panel line 19d on the active matrix substrate 20d to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25a of the black matrix B on the counter substrate 30a and the touch panel lines 19d on the active matrix 20d, and the resistive touch panel is provided in the liquid crystal display device, one of the substrates of the touch panel serves as the active matrix substrate 20d and the other substrate as the counter substrate 30a. Thus, as in Embodiments 1-3, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Embodiment 5

Figure 11:
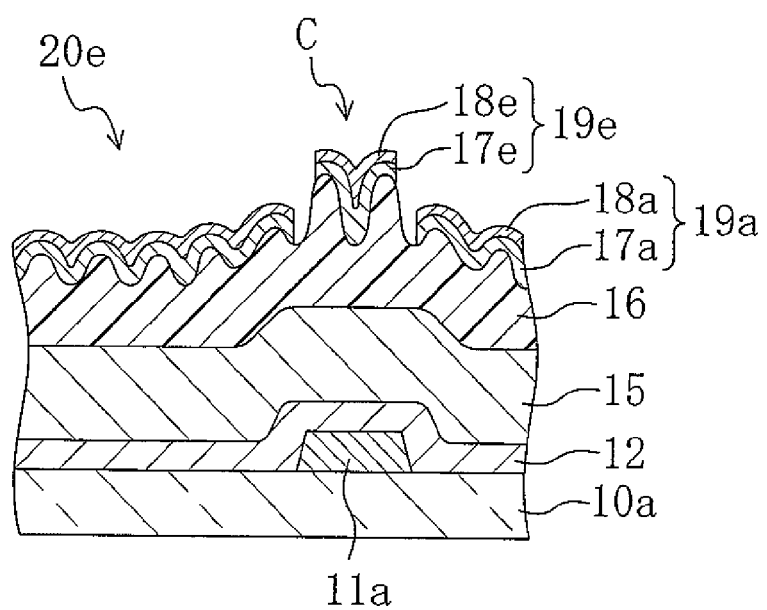
FIG. 11 is a cross-sectional view showing a touch panel section of an active matrix substrate 20e of a liquid crystal display device according to Embodiment 5.

FIG. 11 is a cross-sectional view showing a touch panel section of an active matrix substrate 20e of a liquid crystal display device of the present embodiment.

While the touch panel line 19d is formed to be flat in the active matrix substrate 20d of Embodiment 4, a touch panel line 19e is formed in a raised/recessed shape in the active matrix 20e of the present embodiment.

Specifically, the liquid crystal display device of the present embodiment includes: the active matrix 20e; the counter substrate 30a of Embodiment 1 placed opposing the active matrix 20e; the liquid crystal layer 40 provided between the active matrix substrate 20e and the counter substrate 30a; and a sealant (not shown) provided in a frame pattern for bonding the active matrix substrate 20e and the counter substrate 30a to each other and sealing the liquid crystal layer 40 between the active matrix substrate 20e and the counter substrate 30a.

In the active matrix 20e, the touch panel lines 19e are provided along the direction in which the gate lines 11a extend between the plurality of pixel electrodes 19a provided in a matrix pattern on the second interlayer insulating film 16, as shown in FIG. 11. Here, as shown in FIG. 11, the touch panel line 19e includes a TP lower layer portion 17e formed simultaneously with the transparent electrode 17a and a TP upper layer portion 18e formed simultaneously with the reflective electrode 18a, and has a raised/recessed portion C whose surface is formed in a raised/recessed shape since the surface of the underlying second interlayer insulating film 16 is formed in a raised/recessed shape. Using a half-tone mask, or the like, the second interlayer insulating film 16 is formed so that the raised portion of the raised/recessed shape under the touch panel line 19e is raised more than the raised portion of the raised/recessed shape under the pixel electrode 19a (the reflective electrode 18a).

With the liquid crystal display device of the present embodiment, when the surface of the active matrix substrate 20e or the counter substrate 30a is pressed, the raised portion C of the BM upper layer portion 25a on the counter substrate 30a comes into contact with the raised/recessed portion C of the touch panel line 19e on the active matrix substrate 20e to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25a of the black matrix B on the counter substrate 30a and the touch panel lines 19e on the active matrix 20e, and the resistive touch panel is provided in the liquid crystal display device, one of the substrates of the touch panel serves as the active matrix substrate 20e and the other substrate as the counter substrate 30a. Thus, as in Embodiments 1-4, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Note that the present embodiment employs a configuration where when the surface of the active matrix substrate 20e or the counter substrate 30a is pressed, the raised portions C of the BM upper layer portion 25a of the black matrix B provided on the counter substrate 30a and the raised/recessed portions C of the touch panel lines 19e provided on the active matrix 20e come into contact with each other. However, the present invention may employ a configuration where the resin layer 23b is omitted in the counter substrate 30a so that the BM upper layer portions 25a of the black matrix B are formed flat.

Embodiment 6

Figure 12:
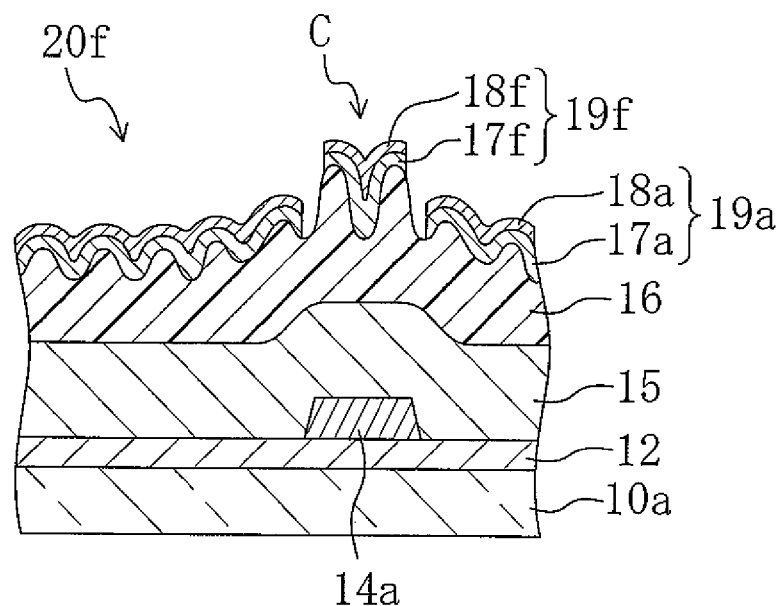
FIG. 12 is a cross-sectional view of a touch panel section of an active matrix substrate 20f of a liquid crystal display device according to Embodiment 6.

FIG. 12 is a cross-sectional view showing a touch panel section of an active matrix substrate 20f of a liquid crystal display device of the present embodiment.

While the touch panel line 19c is formed to be flat in the active matrix substrate 20c of Embodiment 3, a touch panel line 19f is formed in a raised/recessed shape in the active matrix 20f of the present embodiment.

Specifically, the liquid crystal display device of the present embodiment includes: the active matrix 20f; the counter substrate 30b of Embodiment 2 placed opposing the active matrix 20f; the liquid crystal layer 40 provided between the active matrix substrate 20f and the counter substrate 30b; and a sealant (not shown) provided in a frame pattern for bonding the active matrix substrate 20f and the counter substrate 30b to each other and sealing the liquid crystal layer 40 between the active matrix substrate 20f and the counter substrate 30b.

In the active matrix 20f, the touch panel lines 19f are provided along the direction in which the source lines 14a extend between the plurality of pixel electrodes 19a provided in a matrix pattern on the second interlayer insulating film 16, as shown in FIG. 12. Here, the touch panel line 19f includes a TP lower layer portion 17f formed simultaneously with the transparent electrode 17a and a TP upper layer portion 18f formed simultaneously with the reflective electrode 18a, and has a raised/recessed portion C whose surface is formed in a raised/recessed shape since the surface of the underlying second interlayer insulating film 16 is formed in a raised/recessed shape.

With the liquid crystal display device of the present embodiment, when the surface of the active matrix substrate 20f or the counter substrate 30b is pressed, the raised portion C of the BM upper layer portion 25b on the counter substrate 30b comes into contact with the raised/recessed portion C of the touch panel line 19f on the active matrix substrate 20f to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25b of the black matrix B on the counter substrate 30b and the touch panel lines 19f on the active matrix 20f, and the resistive touch panel is provided in the liquid crystal display device, one of the substrates of the touch panel serves as the active matrix substrate 20f and the other substrate as the counter substrate 30b. Thus, as in Embodiments 1-5, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Note that the present embodiment employs a configuration where when the surface of the active matrix substrate 20f or the counter substrate 30b is pressed, the raised portion C of the BM upper layer portion 25b of the black matrix B provided on the counter substrate 30b and the raised/recessed portion C of the touch panel lines 19f provided on the active matrix 20f come into contact with each other. However, the present invention may employ a configuration where the resin layer 23b is omitted in the counter substrate 30b so that the BM upper layer portions 25b of the black matrix B are formed flat.

Embodiment 7

Figure 13:
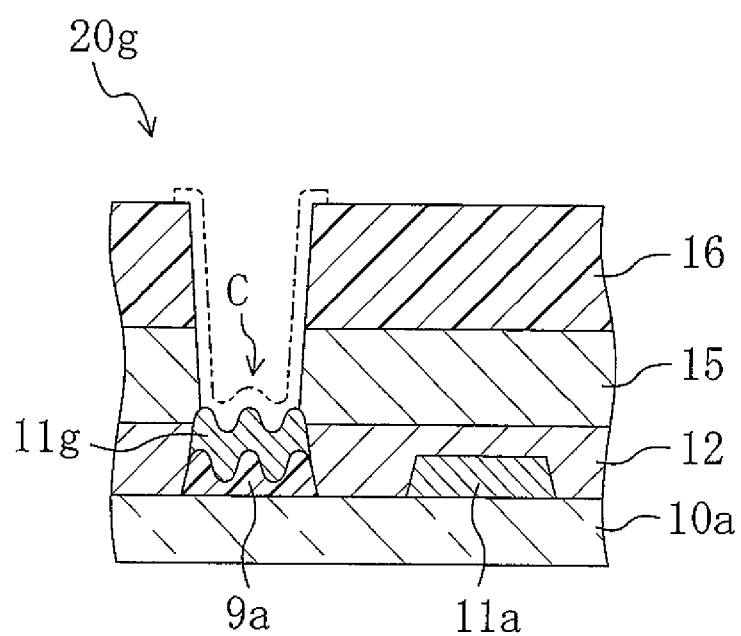
FIG. 13 is a cross-sectional view showing a touch panel section of an active matrix substrate 20g of a liquid crystal display device according to Embodiment 7.

FIG. 13 is a cross-sectional view showing a touch panel section of an active matrix substrate 20g of a liquid crystal display device of the present embodiment.

While the touch panel line 11b is formed to be flat in the active matrix substrate 20a of Embodiment 1, a touch panel line 11g is formed in a raised/recessed shape in the active matrix 20g of the present embodiment.

Specifically, the liquid crystal display device of the present embodiment includes: the active matrix 20g; the counter substrate 30a of Embodiment 1 placed opposing the active matrix 20g; the liquid crystal layer 40 provided between the active matrix substrate 20g and the counter substrate 30a; and a sealant (not shown) provided in a frame pattern for bonding the active matrix substrate 20g and the counter substrate 30a to each other and sealing the liquid crystal layer 40 between the active matrix substrate 20g and the counter substrate 30a.

In the active matrix 20g, the touch panel line 11g is provided next to each gate line 11a so as to overlap a resin layer 9a provided on the insulating substrate 10a, as shown in FIG. 13. Here, the touch panel line 11g has a raised/recessed portion C whose surface is formed in a raised/recessed shape since the surface of the underlying resin layer 9a is formed in a raised/recessed shape.

With the liquid crystal display device of the present embodiment, when the surface of the active matrix substrate 20g or the counter substrate 30a is pressed, the raised portion C of the BM upper layer portion 25a on the counter substrate 30a comes into contact with the raised/recessed portion C of the touch panel line 11g on the active matrix substrate 20g to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25a of the black matrix B on the counter substrate 30a and the touch panel lines 11g on the active matrix 20g, and the resistive touch panel is provided in the liquid crystal display device, one of the substrates of the touch panel serves as the active matrix substrate 20g and the other substrate as the counter substrate 30a. Thus, as in Embodiments 1-6, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

Embodiment 8

Figure 14:
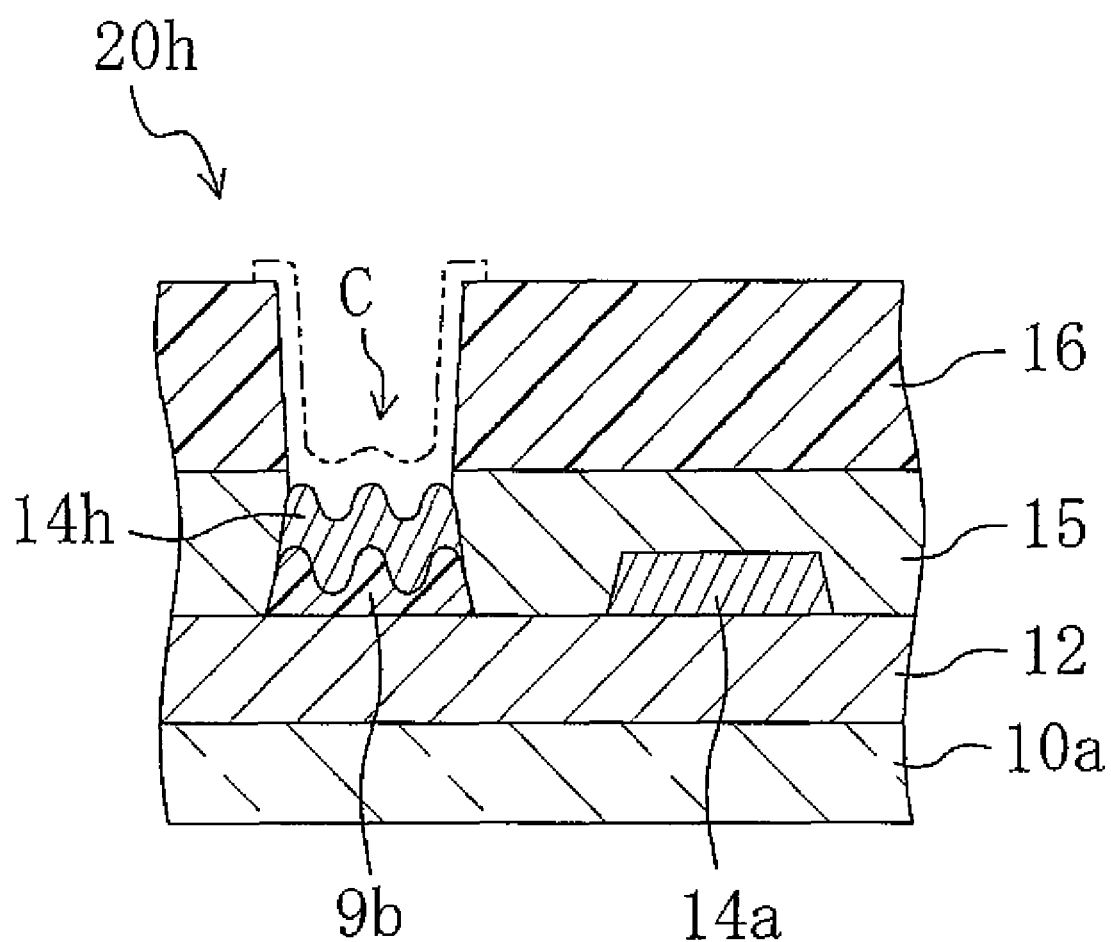
FIG. 14 is a cross-sectional view showing a touch panel section of an active matrix substrate 20h of a liquid crystal display device according to Embodiment 8.

FIG. 14 is a cross-sectional view showing a touch panel section of an active matrix substrate 20h of a liquid crystal display device of the present embodiment.

While the touch panel line 14c is formed to be flat in the active matrix substrate 20b of Embodiment 2, a touch panel line 14h is formed in a raised/recessed shape in the active matrix 20h of the present embodiment.

Specifically, the liquid crystal display device of the present embodiment includes: the active matrix 20h; the counter substrate 30b of Embodiment 2 placed opposing the active matrix 20h; the liquid crystal layer 40 provided between the active matrix substrate 20h and the counter substrate 30b; and a sealant (not shown) provided in a frame pattern for bonding the active matrix substrate 20h and the counter substrate 30b to each other and sealing the liquid crystal layer 40 between the active matrix substrate 20h and the counter substrate 30b.

In the active matrix 20h, the touch panel line 14h is provided next to each source line 14a so as to overlap a resin layer 9b provided on the gate insulating film 12, as shown in FIG. 14. Here, the touch panel line 14h has a raised/recessed portion C whose surface is formed in a raised/recessed shape since the surface of the underlying resin layer 9b is formed in a raised/recessed shape.

With the liquid crystal display device of the present embodiment, when the surface of the active matrix substrate 20h or the counter substrate 30b is pressed, the raised portion C of the BM upper layer portion 25b on the counter substrate 30b comes into contact with the raised/recessed portion C of the touch panel line 14h on the active matrix substrate 20h to establish electrical connection therebetween, thereby detecting the pressed touch position.

With the liquid crystal display device of the present embodiment, since a resistive film of a matrix-type (digital-type) resistive touch panel is specifically realized by the BM upper layer portions 25b of the black matrix B on the counter substrate 30b and the touch panel lines 14h on the active matrix 20h, and the resistive touch panel is provided in the liquid crystal display device, one of the substrates of the touch panel serves as the active matrix substrate 20h and the other substrate as the counter substrate 30b. Thus, as in Embodiments 1-7, there are only two constituent substrates forming a liquid crystal display device having a resistive touch panel, and it is therefore possible to realize a liquid crystal display device having a resistive touch panel in which the thickness of the device itself is reduced and the decrease in optical transmittance is reduced.

While the embodiments above employ configurations where a touch panel line is provided for each display line such as a gate line or a source line, the present invention may employ a configuration where a touch panel line is provided for a plurality of display lines adjacent to each other. That is, the touch panel lines can be thinned out to reduce the number thereof.

While the embodiments above employ semi-transmissive liquid crystal display devices, the present invention is also applicable to transmissive-type and reflective-type liquid crystal display devices.

INDUSTRIAL APPLICABILITY

As described above, since the present invention can realize a liquid crystal display device having a resistive touch panel in which the device itself can be made thinner and lighter, the present invention is useful for car navigation systems, PDAs (Personal Digital Assistants), etc., and particularly it is useful for mobile devices in general including mobile telephones, notebook-type personal computers, portable game devices, digital cameras, etc.

DESCRIPTION OF REFERENCE CHARACTERS

B Black matrix
C Raised portion, raised/recessed portion
11a Gate line (first display line or second display line)
11b, 11g, 14c, 14h, 19c-19f Touch panel line
14a Source line (second display line or first display line)
20a-20h Active matrix substrate
22 Color filter
26 Photospacer
30a, 30b Counter substrate
40 Liquid crystal layer
50a, 50b Liquid crystal display device

The invention claimed is:

1. A liquid crystal display device comprising:
an active matrix substrate including a plurality of first display lines provided so as to extend parallel to each other, and a plurality of second display lines provided so as to extend parallel to each other in a direction crossing the first display lines;
a counter substrate placed opposing the active matrix substrate and including a black matrix provided so as to overlap the first display lines and the second display lines; and
a liquid crystal layer provided between the active matrix substrate and the counter substrate, wherein
the active matrix substrate includes a plurality of touch panel lines provided so as to extend parallel to each other in a direction in which the first display lines extend, and
portions of the black matrix overlapping the second display lines are electrically conductive and are configured so as to come into contact with the touch panel lines when a surface of the active matrix substrate or the counter substrate is pressed.

2. The liquid crystal display device of claim 1, wherein
each of the portions of the black matrix overlapping the second display lines has a raised portion whose surface is formed in a raised shape in an area where the portion crosses the touch panel line.

3. The liquid crystal display device of claim 2, wherein
each raised portion of the black matrix is formed in a hemispherical shape.

4. The liquid crystal display device of claim 1, wherein
each of the touch panel lines includes a raised portion whose surface is formed in a raised shape in an area where the touch panel line crosses the portion of the black matrix overlapping the second display line.

5. The liquid crystal display device of claim 4, wherein
the raised portion of the touch panel line is formed in a hemispherical shape.

6. The liquid crystal display device of claim 1, wherein
portions of the black matrix overlapping the first display lines are made of a resin.

7. The liquid crystal display device of claim 1, wherein
a color filter is provided in a plurality of openings of the black matrix.

8. The liquid crystal display device of claim 1, wherein
the active matrix substrate or the counter substrate is provided with a photospacer having a columnar shape for defining a thickness of the liquid crystal layer.

9. The liquid crystal display device of claim 8, wherein
the portions of the black matrix overlapping the second display lines each include a raised portion whose surface is formed in a raised shape in an area where the portion crosses the touch panel line, and
a height of each raised portion of the black matrix is lower than a height of the photospacer.

10. The liquid crystal display device of claim 8, wherein
each touch panel line includes a raised portion whose surface is formed in a raised shape in an area where the touch panel line crosses the portion of the black matrix overlapping the second display line, and
a height of the raised portion of the touch panel line is lower than a height of the photospacer.

* * * * *